July 15, 1924.

F. SKACH

OVEN

Filed April 15, 1922   3 Sheets-Sheet 1

1,501,628

INVENTOR
Frank Skach
BY Frank Schraeder Jr
Attorney.

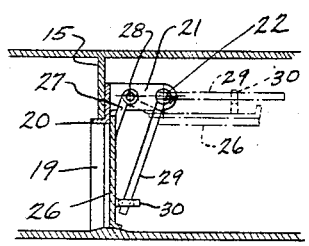
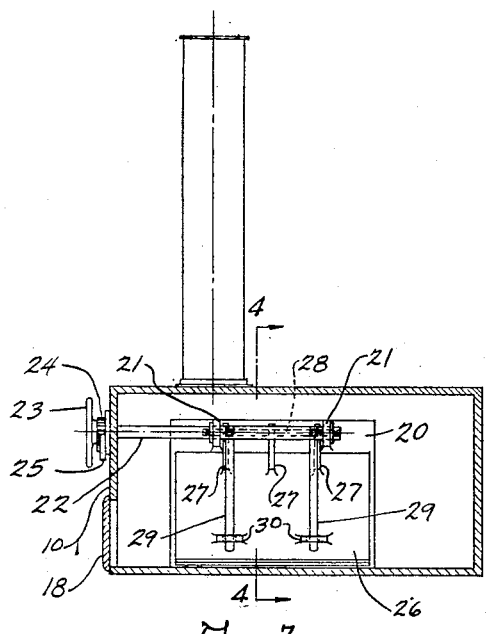

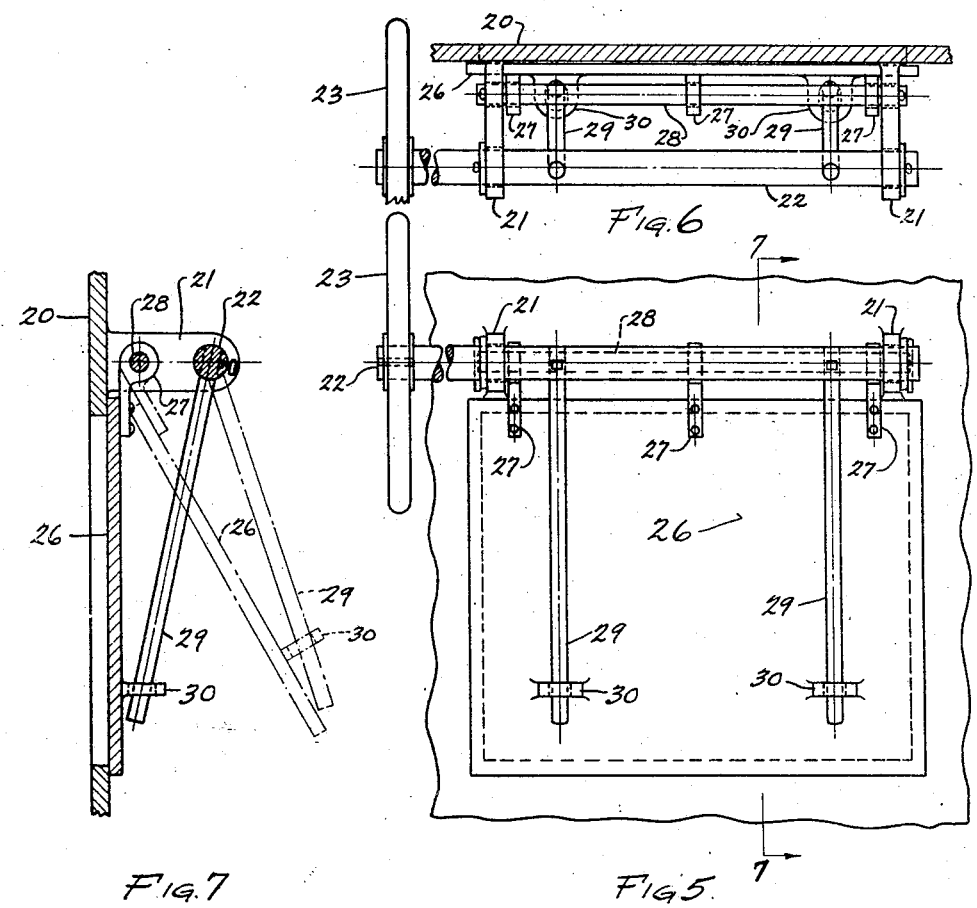

Patented July 15, 1924.

1,501,628

UNITED STATES PATENT OFFICE.

FRANK SKACH, OF CHICAGO, ILLINOIS.

OVEN.

Application filed April 15, 1922. Serial No. 553,049.

*To all whom it may concern:*

Be it known that I, FRANK SKACH, a citizen of the Republic of Czechoslovakia, residing at Chicago, in the county of Cook and State of Illinois, have invented a new and useful Improvement in Ovens, of which the following is a specification.

This invention relates generally to ovens and has particular reference to bakers' ovens. Heretofore it has been the practice, in baking bread, to employ two separate adjacent ovens where the bread was first partially baked in the hotter one, then taken out of such oven and placed in the other of lower temperature where the baking was slowly completed, or the separate ovens were erected one above the other and the same process followed. In the present invention, I have as an object the provision of a single oven constructed with two intercommunicable compartments which affords one compartment to maintain a higher temperature for the initial baking and the other compartment of lower temperature for the final baking. A mechanically operable door for the partition between the oven compartments affords the passage of the partially baked bread from one into the other without removing the bread into contact with the atmosphere and further eliminates undue labor and handling.

With these and other objects in view my invention consists in the novel construction, combination and relative position of the part and members hereinafter described and shown in the accompanying drawings, and particularly pointed out in the appended claims.

Referring to the drawing in which like reference characters indicate like or corresponding parts:

Figure 3 is a sectional elevation taken on line 3—3 of Figure 2, and

Figure 4 is section taken on line 4—4 of Figure 3 illustrating the movement of the door.

Figures 5 and 6 illustrate respectively enlarged elevation and plan view of the door and operating mechanism, Figure 7 is a cross section taken on line 7—7 of Figure 5.

Figure 2:
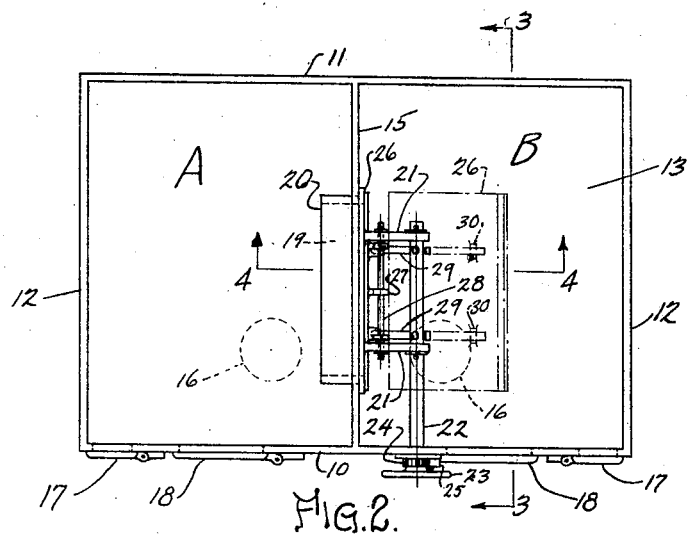
Figure 2 is a cross section of same taken on line 2—2 of Figure 1 showing the two compartments, door, and door operating mechanism.

Referring to the drawings, the oven here illustrated as embodying one form of my invention comprises a front wall 10, a rear wall 11, end walls 12, a floor 13 and top 14.

The partition wall 15 divides the oven into compartments A and B. The oven top 14 is also provided with suitable stocks 16 or outlets as exhausts for the wood or other fuel which is inserted through the fire doors 17 preliminary to firing of the ovens. It is obvious that other means of heating or firing can be utilized and the fire doors may thus be omitted.

Exterior doors 18 are provided for the oven compartments.

The opening 19 between the two compartments is provided with a frame 20, integral with the upper part of which are the two cast ears 21 which support the pivotally mounted door operating shaft 22. The interior end of the shaft 22 extends through the front wall 10 and is operated by a suitable hand-wheel 23 having an integral circular rack 24 adapted to engage a pawl 25 to retain the door 26 in the desired open position. Three riveted pivots 27 form a pivotal support for the door 26 on the shaft 28 which is also supported in the ears 21. Rigidly fixed to the operating shaft 22 are two downwardly disposed arms 29 which project into the relatively large openings of the integral ears 30 cast near the bottom of the door.

Figure 1:
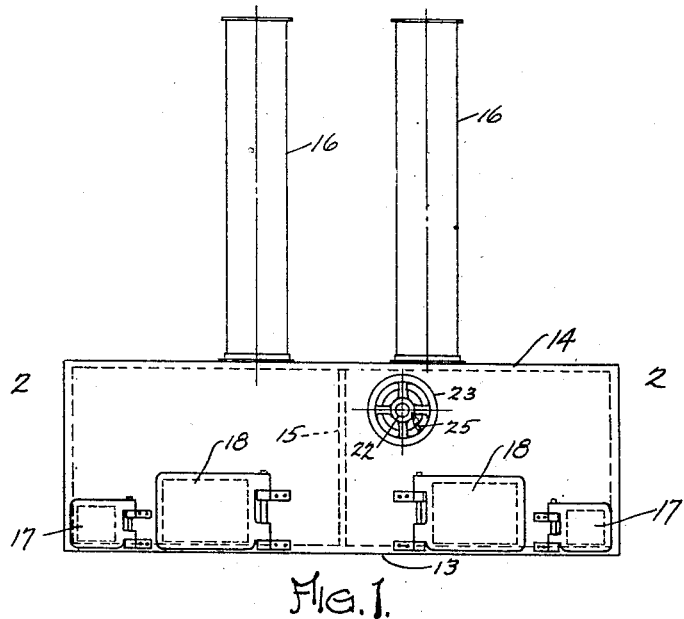
Figure 1 is a front elevation of an oven embodying my invention.

With the door in closed position, an anticlockwise movement of the handwheel 23, looking at Figures 1 and 2, will rotate the shaft 22 and its rigid arms 29 and thus lift the door 26 about its pivotal shaft 28 through the engagement of the arms 29 within the ears 30. Figure 7, shows by dot and dash lines the door 26 in partly open position and Figure 4, shows it in full open position.

It is now obvious that the partly baked bread, which has been initially baked in the compartment A can, with the door 26 in open position, be transferred by means of suitable long-handled ladles inserted through doors 18, into the other compartment B which is of lower temperature.

I claim:

1. In a double compartment baking oven, a door between said compartments, and operating means for said door comprising, a pivot for said door, an operating shaft eccentric to said pivot, and interconnecting means between said shaft and door for raising and lowering same about said pivot.

2. In a double compartment baking oven, a door between said compartments, and operating means for said door comprising, a pivot for said door, an operating shaft eccentric to said pivot, interconnecting means between said shaft and door for raising and lowering same about said pivot, said interconnecting means including an integral eye on said door and an arm rigid with said shaft and operatively engaging within said eye, and means for controlling the angular positions of said door about said pivot.

In witness whereof, I have hereunto subscribed my name this 8th day of April, 1922.

FRANK SKACH.